United States Patent [19]
Bolger et al.

[11] Patent Number: 5,459,478
[45] Date of Patent: Oct. 17, 1995

[54] AIRCRAFT COCKPIT SWITCH CIRCUITRY

[75] Inventors: Richard P. Bolger, Schaumburg; Steve Dumbovic, Elmhurst, both of Ill.

[73] Assignee: Illinois Tool Works, Inc., Glenview, Ill.

[21] Appl. No.: 172,801

[22] Filed: Dec. 27, 1993

[51] Int. Cl.⁶ .................................................. G09G 3/14
[52] U.S. Cl. ........................ 345/46; 345/82; 340/815.45; 250/205
[58] Field of Search ............................... 345/46, 82, 147; 250/205, 553; 340/815.45; 368/83

[56] References Cited

U.S. PATENT DOCUMENTS

| | | | |
|---|---|---|---|
| 3,813,664 | 5/1974 | Geyer | 345/46 |
| 4,626,102 | 5/1977 | Wecker | 345/46 |

FOREIGN PATENT DOCUMENTS

| | | | |
|---|---|---|---|
| 3094295 | 4/1991 | Japan | 345/147 |
| 3126273 | 5/1991 | Japan | 345/82 |
| 5333806 | 12/1993 | Japan | 345/46 |

*Primary Examiner*—Richard Hjerpe
*Assistant Examiner*—Lun-Yi Lao
*Attorney, Agent, or Firm*—T. W. Buckman; D. J. Breh

[57] ABSTRACT

A switch circuit for selectively driving a LED display at either a dim or bright intensity in response to varying input voltages is provided. The switch circuit includes a current regulator device which is responsive to a reference voltage and is coupled to a LED display device for supplying a first level of constant current therethrough so as to illuminate the display device at a dim intensity and for supplying a second level of constant current therethrough so as to illuminate the display device at a bright intensity. A controllable switching device is responsive to input voltages of a wide varying range for being selectively turned on and off and for generating the reference voltage.

7 Claims, 1 Drawing Sheet

AIRCRAFT COCKPIT SWITCH CIRCUITRY

BACKGROUND OF THE INVENTION

This invention relates generally to switching circuitry and more particularly, it relates to a switch circuit for selectively driving a LED display device at either a dim or bright intensity. The switch circuit of the present invention has particular applications in LED display devices used with the control panels of an aircraft cockpit so as to have the capability of driving the display devices at dim and bright levels of intensity. The bright intensity is required in the daylight hours when the brightness of the sunlight into the cockpit may interfere with visibility of display devices. On the ether hand, the dim intensity is used in the evening or nighttimes when there is no outside interference thereby reducing power consumption and prolonging the useful life of the display devices.

It is the user who generally supplies input voltages to the switch circuit. Generally, these input voltages may vary over a wide range for illuminating the display devices either at the dim or bright intensity. The switch circuit is required to have the ability of providing and maintaining either the dim intensity when a first range of the input voltages is supplied or the bright intensity when a second range of the input voltages is supplied.

Accordingly, it would be desirable to provide a switch circuit for selectively driving a LED display device at either a dim or bright intensity in response to varying input voltages. It would also be expedient to provide a switch circuit which operates in a highly efficient manner and has a relatively low power consumption.

SUMMARY OF THE INVENTION

Accordingly, it is a general object of the present invention to provide a switch circuit for selectively driving a LED display device at either a dim or bright intensity which is relatively simple and economical to manufacture and assemble.

It is an object of the present invention to provide a switch circuit for selectively driving a LED display device at either a dim or bright intensity in response to varying input voltages.

It is another object of the present invention to provide a switch circuit for selectively driving a LED display device which includes a current regulator for supplying a first level of constant current through a LED display device so as to illuminate the same at a dim intensity and for supplying a second level of constant current through the display device so as to illuminate the same at a bright intensity, It is still another object of the present invention to provide a switch circuit for selectively driving a LED display device at either a dim or bright intensity which includes a switching regulator for generating two levels of constant current through a LED display device and a controllable switching device for determining the two levels of current in the switching regulator.

In accordance with these aims and objectives, the present invention is concerned with the provision of a switch circuit for selectively driving a LED display device at either a dim or bright intensity which includes an input circuit responsive to input voltages having a wide varying range for generating a control signal. The control signal has a dim level in response to a first range of the input voltages and has a bright level in response to a second range of the input voltages. A switching device is provided and has conduction path electrodes and a control electrode. The switching device is non-conductive when the control signal is in the dim level and is conductive when the control signal is in the bright level. A resistance means is provided and is coupled to the switching device for generating a reference voltage. The resistance means has a first higher resistance value when the switching device is non-conductive and has a second lower resistance value when the switching device is conductive.

A current source is provided and is responsive to the reference voltage for generating a constant current having a first lower level when the switching device is non-conductive and has a second higher level when the switching device is conductive. A LED display device is coupled to the current source and the resistance means so as to be illuminated at a dim intensity when the current source is at the first lower level and to be illuminated at a bright intensity when the current source is at the second higher level.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
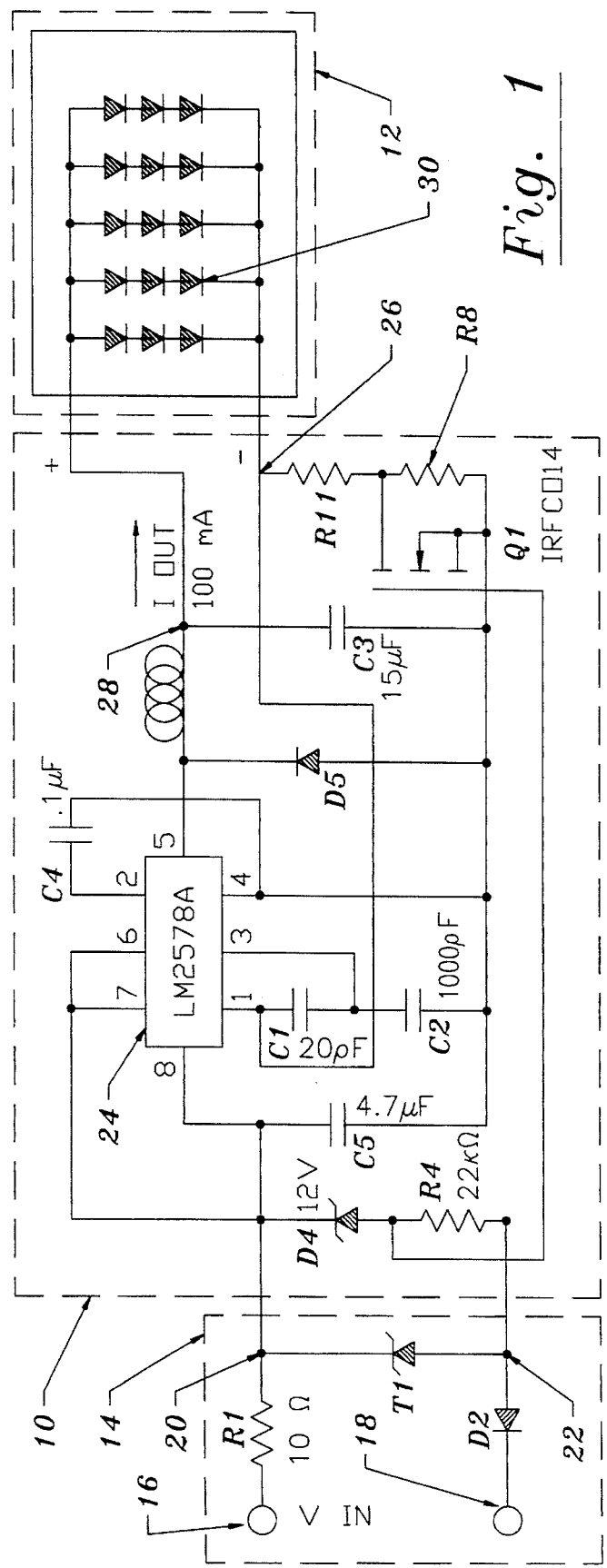
FIG. 1 is a schematic circuit diagram of a switch circuit, constructed in accordance with the principles of present invention.

Referring now in detail to the drawings, there is shown in FIG. 1 a schematic circuit diagram of a switch circuit 10 of the present invention which has the capability of selectively driving a light-emitting-diode (LED) display device 12 either at a dim or bright intensity in response to first and second ranges of input voltages each having a wide varying range from an input circuit 14. The switch circuit of the present invention has particular applications with the display device which may be used on the control panels of an aircraft cockpit or other similar type vehicles.

The input circuit 14 includes input terminals 16 and 18 for receiving an input voltage $V_{in}$ which is varied widely and is typically between 0 to 32 volts DC. The input voltage $V_{in}$ is further divided into the first range of input voltages which is between approximately 10.8 to 13.2 volts DC defining a control signal having a dim input voltage level and the second range of input voltages which is between approximately 18 to 32 volts DC defining the control voltage having a bright input voltage level. The input circuit 14 is comprised of a resistor R1, a transient protection device T1, and a diode D2.

One end of the resistor R1 is connected to the input terminal 16, and the other end of the resistor R1 is tied to one end of the transient protection device T1 and to a first node 20. The other end of the protection device T1 is connected to a second node 22 and to the anode of the diode D2. The cathode of the diode D2 is joined to the input terminal 18. The first and second ranges of the input voltages are also available across the first and second nodes 20 and 22. The protection device T1 is used to protect the components in the switch circuit 10 from being damaged or destroyed by excessive transient voltages.

The switch circuit 10 includes a switching regulator device 24 which is a semiconductor integrated circuit chip and is similar to type LM2578A sold by National Semiconductor Corporation. The switching regulator device 24 is operatively connected so as to serve as a constant current source. The pins 6, 7 and 8 of the switching regulator device are tied together into the first node 20 of the input circuit 14. The input pin 1 of the switching regulator device is connected to a node 26 for receiving a reference voltage.

A timing capacitor C2 is connected between the pins 4 and 3 so as to set the frequency of an oscillator internal to the switching regulator device. With the value of 1000 pf for the capacitor C2, the oscillator frequency will be approximately 80 KHz. A compensating capacitor C4 is connected between the input pin 2 and the ground pin 4 of the switching regulator device so as to provide stability. A capacitor C1 is connected between the pins 3 and 1. The output pin 5 of the switching regulator device generates a constant level of current in response to the voltage at the first node 20 of the input circuit 14 so that the reference voltage (i.e., 1 volt) at the node 26 will always remain the same.

The switch circuit 10 also has a Zener diode D4 and a series resistor R4 which are connected in parallel with the filter capacitor C5. The capacitor C5 is also connected across the first and second nodes 20 and 22. The switch circuit 10 further includes a switching N-channel field-effect transistor (FET) Q1 which has its gate electrode connected to receive the control voltage at the junction of the diode D4 and the resistor R4. The drain electrode of the transistor Q1 is connected to the node 26 via a first controlled resistor R11. The source electrode of the transistor Q1 is connected to the second node 22. A second controlled resistor R8 is connected in parallel between the drain and source electrodes defining conduction path electrodes of the transistor Q1. The transistor Q1 is of a type similar to IRFC014, sold by International Rectifier Corporation of El Segundo, Calif. The IRFC014 FET is particularly well-suited to this application as it has a relatively low "on" impedance.

The diode D5 has its cathode connected to the output pin 5 of the switching regulator device 24 and its anode connected to the ground pin 4. A filter formed by an inductor L1 and an output capacitor C3 is also coupled to the output pin 5 so as to reduce the ripple in the pulsed output voltage. As can be seen, the inductor L1 has its one end connected to the output pin 5 and its other end connected to the node 28 and to one end of the capacitor C3. The other end of the capacitor C3 is connected to the ground pin 4.

The LED display device 12 defining an utilization device is preferably made up of a LED array having a plurality of light-emitting diodes 30 arrayed in rows and columns. In this particular example, there are 3 rows and 5 columns which are arranged so as to form a 3×5 LED array. The diodes 30 may be chosen to have any desired color such as red, white, amber and the like. The actual resistance values of the first and second controlled resistors R11 and R8 are changed in order to accommodate for the different types of colored light-emitting diodes since they have varying voltage drops across their junctions. The display device 12 is interconnected between the nodes 26 and 28.

Figure 2:
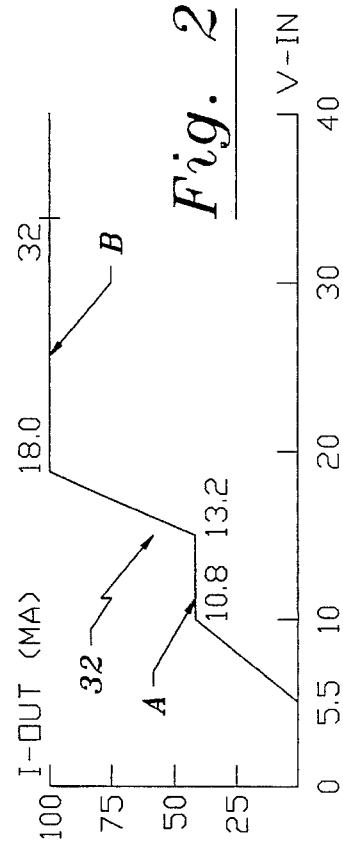
FIG. 2 is a graph of the output current in response to varying input voltages, useful in understanding the operation of the present invention.

The operation of the switch circuit 10 of the present invention will now be explained with reference to the graph of the output current in FIG. 2. As can be seen, when the input voltage $V_{in}$ is in the first range between approximately 10.8 and 13.2 volts DC the constant current segment A of the curve 32 will be generated wherein the output constant current to the LED display 12 will be approximately 40 mA. This first lower constant current level of 40 mA defines the dim intensity of the light-emitting diodes 30. When the input voltage is in the first range, Zener diode D4 will be turned OFF and no control voltage will be applied to the gate electrode of the transistor Q1. Therefore, the transistor Q1 will be turned OFF. As a result, the node 26 will have approximately a 1 volt reference developed across the combined first and second controlled resistors R1 and R8. This creates the first lower constant current level which flows through the LED display device 12 to produce the dim intensity.

On the other hand, when the input voltage $V_{in}$ is in the second range between 18 to 32 volts DC the constant current segment B at the curve 32 will be generated wherein the output constant current through the LED display device 12 will be increased to approximately 100 mA. The second higher constant current level of 100 mA defines the bright intensity of the light-emitting diodes 30. When the input voltage is in the second range, the Zener diode D4 will be turned ON and the control voltage across the resistor R4 will exceed the threshold voltage of the transistor Q1. Accordingly, the transistor Q1 will be turned ON. Consequently, the second controlled resistor R8 will be effectively shorted out by the low "on" impedance of the transistor Q1. In order to maintain the 1 volt reference on the node 26 across only the first controlled resistor R11, the switching regulator device 24 will cause the output current to be increased to approximately 100 mA. This creates the second higher constant current level which flows through the LED display device 12 so as to produce the bright intensity.

From the foregoing detailed description, it can thus be seen that the present invention provides a switch device for selectively driving a LED display device at either a dim or bright intensity in response to varying input voltages. The switch device of the present invention includes a current regulator responsive to a reference voltage and being coupled to a LED display device for supplying a first level of constant current therethrough so as to illuminate the same at a dim intensity and for supplying a second level of constant current therethrough so as to illuminate the same at a bright intensity. A controllable switching device is responsive to input voltages of a wide range for being selectively turned ON or OFF and for generating the reference voltage.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A switch circuit for selectively driving a display device at either a dim or bright intensity comprising:

input circuit means responsive to input voltages having a wide varying range for generating a control signal, said control signal having a dim level in response to a first range of said input voltages and having a bright level in response to a second range of said input voltages;

said input circuit means comprising switching means being formed of a field-effect transistor having a drain, a source and a gate, said drain and source defining conduction path electrodes and said gate defining a control electrode, said switching means being non-conductive when said control signal is in the dim level and being conductive when said control signal is in the bright level;

said input circuit means including a Zener diode and a resistor connected in series, the junction of said Zener diode and said resistor being connected to the gate of said field-effect transistor to provide the control signal;

said input circuit means comprising resistance means coupled to said switching means for generating a reference voltage, said resistance means having a first higher resistance value when said switching means is non-conductive and having a second lower resistance value when said switching means is conductive;

said resistance means being formed of a first controlled resistor and a second controlled resistor connected in series with said first controlled resistor, said second controlled resistor being connected in parallel with said conduction path electrodes of said switching means so as to short out the same when said switching means is conductive;

said input circuit means further comprising current source means responsive to said reference voltage for generating constant currents having a first lower level when said switching means is non-conductive and having a second higher level when said switching means is conductive; and a display device coupled to said current source means and said resistance means so as to be illuminated at a dim intensity when said constant current is at the first lower level and to be illuminated at a bright intensity when said constant current is at the second higher level.

2. A switch circuit as claimed in claim 1, wherein said current source means is comprised of a switching regulator.

3. A switch circuit as claimed in claim 1, wherein said display device comprises a light-emitting diode (LED) array.

4. A switch circuit as claimed in claim 3, wherein said LED array is formed of 3 rows and 5 columns of light-emitting diodes.

5. A switch circuit as claimed in claim 1, wherein the wide range of said input voltages is between approximately 0 and 32 volts DC.

6. A switch circuit as claimed in claim 5, wherein said first range of said input voltages is approximately between 10.8 to 13.2 volts DC.

7. A switch circuit as claimed in claim 6, wherein said second range of said input voltages is approximately between 18 to 32 volts DC.

* * * * *